United States Patent
Ding

(10) Patent No.: US 8,393,523 B1
(45) Date of Patent: Mar. 12, 2013

(54) PULSED ULTRASONIC STIR WELDING METHOD

(75) Inventor: R. Jeffrey Ding, Athens, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/523,310

(22) Filed: Jun. 14, 2012

Related U.S. Application Data

(62) Division of application No. 13/240,075, filed on Sep. 22, 2011.

(51) Int. Cl.
*B23K 1/06* (2006.01)
*B23K 20/12* (2006.01)

(52) U.S. Cl. ............ 228/112.1; 228/113; 228/114; 228/2.1; 228/110.1; 228/1.1; 228/111

(58) Field of Classification Search ........... 228/110.1, 228/1.1, 111, 112.1, 113, 114, 2.1
See application file for complete search history.

(56) References Cited

U.S. PATENT DOCUMENTS
2005/0242066 A1* 11/2005 Statnikov .............. 219/76.13

FOREIGN PATENT DOCUMENTS
JP 2005028382 A * 2/2005

OTHER PUBLICATIONS
Computer english translation of JP 2005028382 A.*

* cited by examiner

*Primary Examiner* — Erin Saad
(74) *Attorney, Agent, or Firm* — Peter J. Van Bergen; James J. McGroary

(57) ABSTRACT

A method of performing ultrasonic stir welding uses a welding head assembly to include a plate and a rod passing through the plate. The rod is rotatable about a longitudinal axis thereof. In the method, the rod is rotated about its longitudinal axis during a welding operation. During the welding operation, a series of on-off ultrasonic pulses are applied to the rod such that they propagate parallel to the rod's longitudinal axis. At least a pulse rate associated with the on-off ultrasonic pulses is controlled.

14 Claims, 2 Drawing Sheets

PULSED ULTRASONIC STIR WELDING METHOD

CROSS-REFERENCES TO RELATED APPLICATIONS

Figure 1:
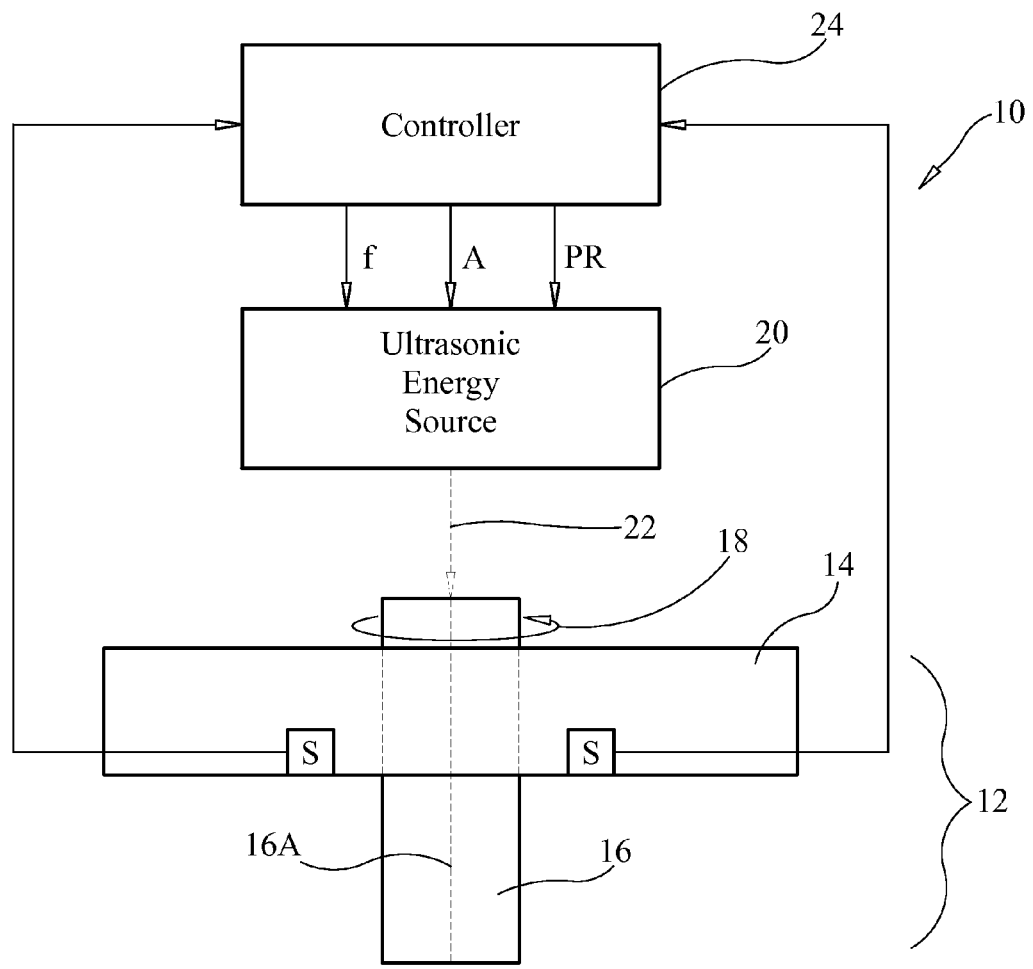

This application is a divisional application of U.S. patent application Ser. No. 13/240,075, filed on Sep. 22, 2011.

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates to stir welding methods. More specifically, the invention is a stir welding method utilizing pulsed ultrasonic energy.

2. Description of the Related Art

Stir welding is a form of welding that utilizes a small stir pin to mix abutting or faying surfaces of two pieces of material (e.g., metal materials) to thereby form a joint between the two pieces of material. The materials must be heated into a plastic state where they abut prior to being "stirred." There are several ways to achieve such heating. In one type of stir welding known as friction stir welding (FSW), a pin tool includes a larger diameter shoulder and a smaller diameter threaded pin. The entire pin tool is rotated and the rotating pin is driven axially into the weld joint until the rotating shoulder comes into contact with the material surface. The rotating shoulder generates frictional energy/heat as it rotates on the material surface to thereby heat the material into its plastic state. The high rotation rates needed to generate the frictional forces, as well as the frictional forces, tend to wear out the pin tool in relatively short periods of time especially when joining thick sections of temperature-resistant alloys such as titanium and steel.

SUMMARY OF THE INVENTION

Accordingly, it is an object of the present invention to provide a stir welding method.

Another object of the present invention is to provide a stir welding method that increases tool life.

Other objects and advantages of the present invention will become more obvious hereinafter in the specification and drawings.

In accordance with the present invention, a method of performing ultrasonic stir welding uses a welding head assembly to include a plate and a rod passing through the plate. The rod is rotatable about a longitudinal axis thereof. In the method, the rod is rotated about its longitudinal axis during a welding operation. A series of on-off ultrasonic pulses are applied to the rod as it rotates such that the on-off ultrasonic pulses propagate parallel to the rod's longitudinal axis. At least a pulse rate associated with the on-off ultrasonic pulses is controlled.

BRIEF DESCRIPTION OF THE DRAWING(S)

Figure 2:
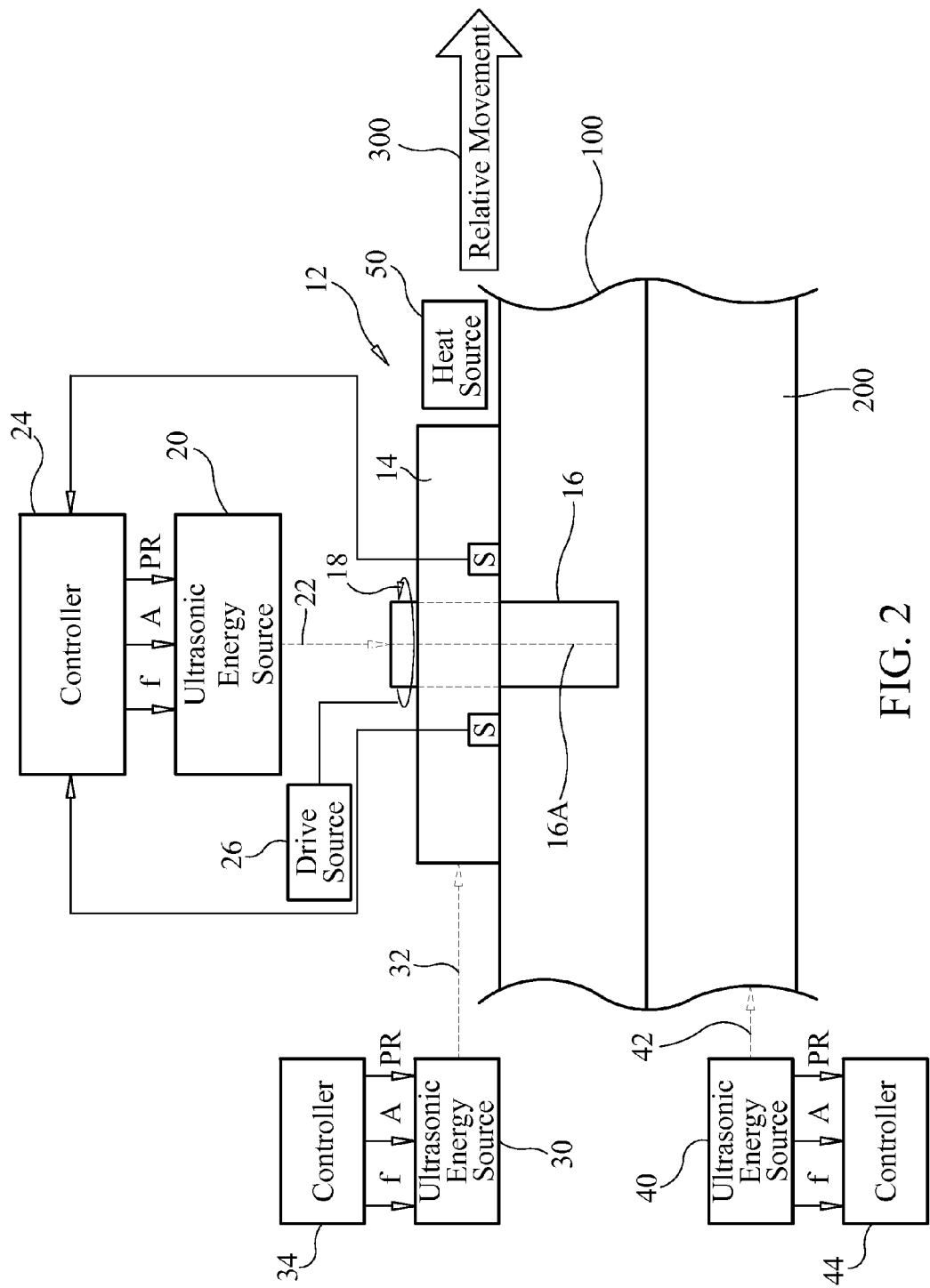

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a schematic view of an ultrasonic stir welding system used to implement an embodiment of the present invention; and FIG. 2 is a schematic view of an ultrasonic stir welding system used to implement another embodiment of the present invention.

DESCRIPTION OF THE PREFERRED EMBODIMENT(S)

Referring now to the drawings and more particularly to FIG. 1, an ultrasonic stir welding (USW) system used to implement an embodiment of the present invention is shown and is referenced generally by numeral 10. USW system 10 will be used to weld two abutting material surfaces that are not shown in order to more clearly illustrate the elements used by the method of the present invention.

USW system 10 includes a welding head assembly 12 defined by a containment plate 14 and a stir pin or rod 16 that will generally pass through containment plate 14. Stir rod 16 can be a substantially cylindrical rod that is capable of rotation about its longitudinal axis 16A while plate 14 either remains stationary, rotates at the same speed as stir rod 16, or rotates at a different speed than stir rod 16. Rotational motion of stir rod 16 is indicated by rotational arrow 18 and will occur during a stir welding operation as would be understood by one of ordinary skill in the art. Stir rod 16 is made from a rigid material (e.g., metal) that can withstand the rigors of a stir welding operation. Such materials are well known in the art of stir welding. Further, the particular motor/system used to provide rotation of stir rod 16 relative to plate 14 is not a limitation of the present invention.

In accordance with the present invention, an ultrasonic source 20 capable of generating ultrasonic energy is coupled to stir rod 16. The frequency of the ultrasonic energy is not a limitation of the present invention, but generally frequencies up to approximately 100 KHz would be sufficient for most applications. During a welding operation with plate 14 abutting a work piece's surface and rotating stir rod 16 embedded in the work piece, ultrasonic source 20 is controlled in such a way that on-off pulses (indicated by dashed line 22) of ultrasonic energy produced by source 20 are applied to stir rod 16. More specifically, ultrasonic pulses 22 are applied to stir rod 16 as it rotates in a work piece such that pulses 22 propagate along or parallel to longitudinal axis 16A.

The application of ultrasonic energy to rotating stir rod 16 enhances the heating of the work piece to its plastic state that is required for the welding operation. This reduces the rotational rates required for stir rod 16 thereby improving tool life. In addition, the application of ultrasonic energy to rotating stir rod 16 reduces the frictional forces between rotating stir rod 16 and the work piece in which it rotates. While this also improves tool life, constant application of the ultrasonic energy is detrimental to the stir welding operation. That is, the stir welding operation requires that rotating stir rod 16 "stick" to plasticized work piece material just forward of stir rod 16 with the "sticking" plasticized work piece material then being rotated or moved to just aft of stir rod 16 where it is released back into the work piece. However, constant application of ultrasonic energy to rotating stir rod 16 reduces this "sticking" attribute as the frictional forces are reduced between rotating stir rod 16 and the plasticized work piece thereby comprising the quality of the weld. The present invention overcomes this problem by applying the ultrasonic energy to rotating stir rod 16 in the form of pulses 22. During the "on" period of pulses 22, the work piece is being heated while frictional forces acting on rotating stir rod 16 are reduced. During the "off" period of pulses 22, the plasticized work piece material "sticks" to rotating stir rod 16 so it can be moved and released just aft of stir rod 16.

Ultrasonic pulses 22 can be controlled during a welding operation. The controllable parameters of pulses 22 include the frequency of the ultrasonic energy, the amplitude of the ultrasonic energy, and the on-off pulse rate of pulses 22. Such control can be provided by a controller 24 coupled to source 20 where controller 24 can adjust the frequency (f) and/or amplitude (A) of the ultrasonic energy as well as the pulse rate (PR) of pulses 22. The particular construction and/or arrangement of source 20 and controller 24 are not limitations of the present invention. For example, source 20 and controller 24 could be an integrated device or separate devices without departing from the scope of the present invention.

Controller 24 could employ pre-programmed or open-loop control of pulses 22, or could employ an adaptable closed-loop control of pulses 22. For example, in terms of closed-loop control, one or more sensors "S" could be included with plate 14 (and/or stir rod 16) to sense attributes (e.g., temperature) of the work piece in the region of stir rod 16. The sensed attributes could then be used by controller 24 to adjust the attributes of pulses 22 to improve the welding operation.

A system that can be used to implement another embodiment of the method of the present invention is illustrated in FIG. 2 where identical reference numerals are used for elements common to those described above. In FIG. 2, a work piece to be welded is shown and is referenced by numeral 100 and a base or anvil supporting work piece 100 is referenced by numeral 200. Similar to plate 14, base 200 is made from a rigid material that can withstand the rigors of an ultrasonic stir welding operation of the present invention. A drive source 26 coupled to stir rod 16 provides rotation 18 needed for a welding operation.

During a welding operation, relative movement (indicated by arrow 300) is induced between welding head assembly 12 and work piece 100 where movement 300 is generally perpendicular to longitudinal axis 16A of rotating stir rod 16. Work piece 100 can remain stationary on base 200 as welding head assembly 12 moves in accordance with arrow 300, or welding head assembly 12 and base 200 can remain stationary while work piece 100 is moved in accordance with arrow 300.

Regardless of how relative movement 300 is induced, the embodiment in FIG. 2 includes one or more additional ultrasonic energy sources. In the illustrated embodiment, two ultrasonic energy sources 30 and 40 are provided with corresponding controllers 34 and 44. Source 30/controller 34 cooperate to produce/apply ultrasonic pulses 32 to plate 14 in a direction parallel to relative movement 300 (or perpendicular to longitudinal axis 16A of stir rod 16). Controller 34 can control frequency (F), amplitude (A), and/or pulse rate (PR) of pulses 32 where the particular attribute values can be independent of those associated with pulses 22. Similarly, source 40/controller 44 cooperate to produce/apply ultrasonic pulses 42 to base 200 such that pulses 42 propagate in base 200 in a direction parallel to relative movement 300 (or perpendicular to longitudinal axis 16A of stir rod 16). Controller 44 can control frequency (F), amplitude (A), and/or pulse rate (PR) of pulses 42 where the particular attribute values can be independent of those associated with pulses 22 and pulses 32. The application of pulses 32 and/or 42 during a welding operation enhances heating of work piece 100 while also reducing frictional forces generated by relative movement 300. Note that some materials and/or applications may require an additional heat source 50 properly positioned based on relative movement 300 for heating the material(s) to be welded into a plastic state. Each of controllers 34 and 44 can employ open-loop or closed-loop control where closed-loop control could utilize inputs from sensors "S" included in plate 14 as described above.

The advantages of the present invention are numerous. Stir welding tool life will be increased as the use of ultrasonic energy applied during welding reduces frictional forces acting on the tool. By pulsing the ultrasonic energy, the stir welding tool is "pulsed" between its heating/friction reduction and welding functions. Additional pulsed ultrasonic energy can be applied to the tool's containment plate and/or the base/anvil on which the work piece sits to enhance heating and reduce frictional forces generated during a stir welding operation.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of performing ultrasonic stir welding, comprising the steps of:
   providing a welding head assembly to include a plate and a rod passing through said plate wherein said rod is rotatable about a longitudinal axis thereof, said rod being in contact with a work piece to be welded;
   rotating said rod about said longitudinal axis thereof during a welding operation wherein said work piece is plasticized adjacent said rod with a first region of said work piece plasticized and in contact with said rod being forward of said rod and a second region of said work piece plasticized and in contact with said rod being aft of said rod;
   applying a series of on-off ultrasonic pulses to said rod as said rod rotates about said longitudinal axis thereof such that said on-off ultrasonic pulses propagate parallel to said longitudinal axis of said rod; and
   controlling at least a pulse rate associated with said on-off ultrasonic pulses during said step of rotating wherein said pulse rate is selected such that said first region of said work piece plasticized sticks to said rod and said second region of said work piece plasticized is released from said rod.

2. A method according to claim 1, further comprising the step of controlling at least one of frequency and amplitude associated with said on-off ultrasonic pulses.

3. A method according to claim 1, wherein said step of controlling is accomplished using a closed-loop control system.

4. A method according to claim 2, wherein said steps of controlling are accomplished using a closed-loop control system.

5. A method of performing ultrasonic stir welding, comprising the steps of:
   providing a stationary base;
   providing a welding head assembly to include a plate spaced apart from said base and a rod with an end of said rod spaced apart from said base, said rod passing through said plate wherein said rod is rotatable about a longitudinal axis thereof;

rotating said rod about said longitudinal axis thereof during a welding operation;

applying a series of on-off ultrasonic pulses to said rod as said rod rotates about said longitudinal axis thereof such that said on-off ultrasonic pulses propagate parallel to said longitudinal axis of said rod; and applying additional on-off ultrasonic pulses to at least one of said base and said plate as said rod rotates such that said additional on-off ultrasonic pulses propagate perpendicular to said longitudinal axis of said rod.

6. A method according to claim 5, further comprising the step of controlling a pulse rate associated with said on-off ultrasonic pulses.

7. A method according to claim 6, wherein said step of controlling is accomplished using a closed-loop control system.

8. A method according to claim 6, further comprising the step of controlling at least one of frequency and amplitude associated with said on-off ultrasonic pulses.

9. A method according to claim 8, wherein said steps of controlling are accomplished using a closed-loop control system.

10. A method according to claim 5, further comprising the step of controlling a pulse rate associated with said additional on-off ultrasonic pulses.

11. A method according to claim 10, wherein said step of controlling is accomplished using a closed-loop control system.

12. A method according to claim 10, further comprising the step of controlling at least one of frequency and amplitude associated with said additional on-off ultrasonic pulses.

13. A method according to claim 12, wherein said steps of controlling are accomplished using a closed-loop control system.

14. A method according to claim 5, wherein a material to be welded resides between said base and said plate, said method further comprising the step of heating the material to a plastic state thereof.

\* \* \* \* \*